US008533153B2

(12) United States Patent
Bultman et al.

(10) Patent No.: US 8,533,153 B2
(45) Date of Patent: Sep. 10, 2013

(54) STORING DATA FOLLOWING A POWER OUTAGE AND WITHOUT A PROPER TIME SOURCE

(75) Inventors: Robert Marten Bultman, Louisville, KY (US); Irena Jozic McDowell, Louisville, KY (US); Joshua Blake Huff, Louisville, KY (US)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 13/183,017

(22) Filed: Jul. 14, 2011

(65) Prior Publication Data

US 2013/0018843 A1 Jan. 17, 2013

(51) Int. Cl.
*G06F 7/00* (2006.01)
*G06F 17/00* (2006.01)
(52) U.S. Cl.
CPC .. *G06F 7/00* (2013.01); *G06F 17/00* (2013.01)
USPC ............ 707/609; 707/610; 707/674; 707/690

(58) Field of Classification Search
USPC .................................. 707/609, 610, 674, 690
See application file for complete search history.

(56) References Cited

U.S. PATENT DOCUMENTS

| 7,953,710 | B2* | 5/2011 | Novik et al. .................. 707/692 |
| 8,244,566 | B1* | 8/2012 | Coley et al. .................. 705/7.11 |
| 2004/0155960 | A1* | 8/2004 | Wren et al. .................... 348/150 |
| 2007/0255763 | A1* | 11/2007 | Beyerle et al. ................ 707/201 |
| 2009/0083444 | A1* | 3/2009 | Faist ............................. 709/248 |

* cited by examiner

*Primary Examiner* — Jay Morrison
(74) *Attorney, Agent, or Firm* — Global Patent Operation; Marc A. Vivenzio

(57) ABSTRACT

A system associated with a home energy gateway (HEG) is provided. The system includes a database having a plurality of data entry blocks, each block corresponding to a time interval and an internal database timing device configured to sync with an external real-time time server and maintain accurate time in the database. The home energy gateway is configured to add time-stamped data entries to the database. A homeowner may select a time period for a power outage so that the system sends an alert if the time period power outage is exceeded.

24 Claims, 4 Drawing Sheets

STORING DATA FOLLOWING A POWER OUTAGE AND WITHOUT A PROPER TIME SOURCE

BACKGROUND OF THE DISCLOSURE

The following disclosure relates to energy management, and more particularly to a premises energy management system for the management of household consumer appliances, as well as other energy consuming devices and/or systems found in the home. The present disclosure finds particular application to the use of a Home Energy Gateway (HEG) for storing data entries in a time-stamp oriented database.

Current utility companies charge a flat rate for energy usage, but with the increasing cost of fuel prices and high energy usage during certain parts of the day, utility companies have to buy more energy to supply customers during peak demand. Consequently, utility companies are beginning to charge higher rates during peak demand. If peak demand can be lowered, then a potential cost savings can be achieved and the peak load that the utility company has to accommodate is lessened.

Home Energy Management (HEM) systems have been introduced as a way to reduce energy consumption in homes and buildings. One HEM is in the form of a special custom configured computer with an integrated display, which communicates to devices in the home and stores data, and also has simple algorithms to enable energy reduction. This type of device may include a keypad for data entry or the display may be touch screen. This device is either integrated in a unitary housing, or if the display is not in the same housing, the display and computer are otherwise connected/associated to work as a single unit. A second HEM system is in the form of a low cost router/gateway device in a home that collects information from devices within the home and sends it to a remote server and in return receives control commands from the remote server and transmits the commands to energy consuming devices in the home. As with the first type of HEM, this second form of HEM may be custom configured including a computer and integrated or otherwise connected/associated display (and keypad if used) designated as a single unit. Both of these systems have significant disadvantages due to high consumer cost, low flexibility and increased system complexity.

Accordingly, a Home Energy Gateway (HEG), has been developed as a premise data management system that is significantly smaller, cheaper, and consumes less power, as described in U.S. application Ser. No. 12/983,425, fully incorporated herein by reference. The HEG also has the capability of operating over multiple communication networks which each use different formats, protocols, and bandwidths. This allows the HEG to acquire and manipulate (e.g. reformat) data of one communication network (e.g., that which monitors/controls the home appliances) and to supply that manipulated data to another communication network (e.g. to the consumer electronics network, such as to a home computer, smart phone, web-enabled TV, etc.), even though these networks are not generally compatible.

The data acquired, manipulated, and transmitted by the HEG is also stored in a database consisting of an organized collection of data for one or more users. The HEG comprises a single board computer configured to interact with multiple communication interfaces that may have different physical, networking, and application layers. A first interface channel may have an Ethernet and Wifi interface. The second and third interface channels may comprise two Zigbee interfaces and are provided so the HEG can talk to two separate energy networks. Using the second interface, the HEG communicates with a smart meter network, which comprises an energy-metering device, and records the data in the database of the HEG. The HEG then communicates to the devices within a home using the other Zigbee communication interface (third interface), wherein the HEG reads the consumption of the individual energy consuming devices and records it in the database.

Utility communications such as price signals, demand response signals, and text messages are received through the second interface, recorded in the database, and communicated to the devices in the home through the third interface. The command and control information of the energy consuming devices and their responses to utility signals is received through the third communication interface, recorded in the database, and communicated to the utility company via the second interface, the communication being routed through the utility smart meter. The stored events, energy data, utility messages, and consumer setting preferences are accessed through the first interface.

A database management system is a set of software programs that control the organization, storage, management, and retrieval of data in a database. A time-stamp oriented database management system allows HEG data to be stored in a particular time-sensitive order and stamped with a particular time to help organize and manage the database. If a system associated with a database does not include an internal time source, an external time source must be relied upon for time-determination. However, if a database has either not yet established, or loses, this connection with an external time source, there is no guidance as to where to place an entry in the database. Since, it may be desirable to continue to enter and store data even if the external time source is not available, there is a need for a method of storing entries in a database with a time-stamp following the restoration of power, without having to have a properly synchronized time clock.

Further, if there is a loss of power, the homeowner may desire to know which, if any appliances have been without power, and how long was the appliance(s) without power. Thus, a need exists to provide this additional information in connection with a HEM or HEG.

SUMMARY OF THE DISCLOSURE

In accordance with one aspect of the present disclosure, a database associated with a home energy gateway (HEG) is provided. The database comprises a plurality of data entry blocks, each block corresponding to a time interval and an internal database timing device configured to sync with an external real-time time server (i.e., a time source) and maintain accurate time in the database. The home energy gateway is configured to add time-stamped data entries to the database.

In accordance with another aspect of the present disclosure, a method of storing data entries in a timestamp-oriented database associated with an HEG after incurring a power failure is provided, wherein the HEG comprises an internal clock configured to sync with a real-time external time server. The method includes dividing the database into fixed interval data blocks, wherein each data block can accept one data entry, adding one or more data entries to the database by storing the one or more data entries in data blocks corresponding to the timestamp of the entry, processing a data bit indicative of a loss of sync with the external time server, re-syncing the internal clock with the external time server, adding at least one additional entry to the database immediately following the last data entry, and updating the internal clock with real-time.

In accordance with yet another aspect of the present disclosure, a method for maintaining real-time based database entry locations in a home energy gateway (HEG) database is provided. The method comprises syncing a real-time time server external to said HEG with an internal database timer, dividing the database into equal data entry blocks, wherein each block represents a time interval, adding one data entry to the database per interval, wherein each data entry is provided with a timestamp, re-syncing the external time server with the internal database timer in the event of a loss of sync, and determining a correct database entry block location for data entries added after the loss of sync.

Data regarding a power outage is provided to the homeowner, and the information indicates whether the HEM or HEG was without power, and/or whether one or more appliances associated with the system were without power for some or all of the power outage time period. Suitable thresholds relating to the length of time of the power outage can be included in the system, or may be selected or established by the homeowner.

DETAILED DESCRIPTION OF THE PREFERRED EMBODIMENTS

Figure 1:
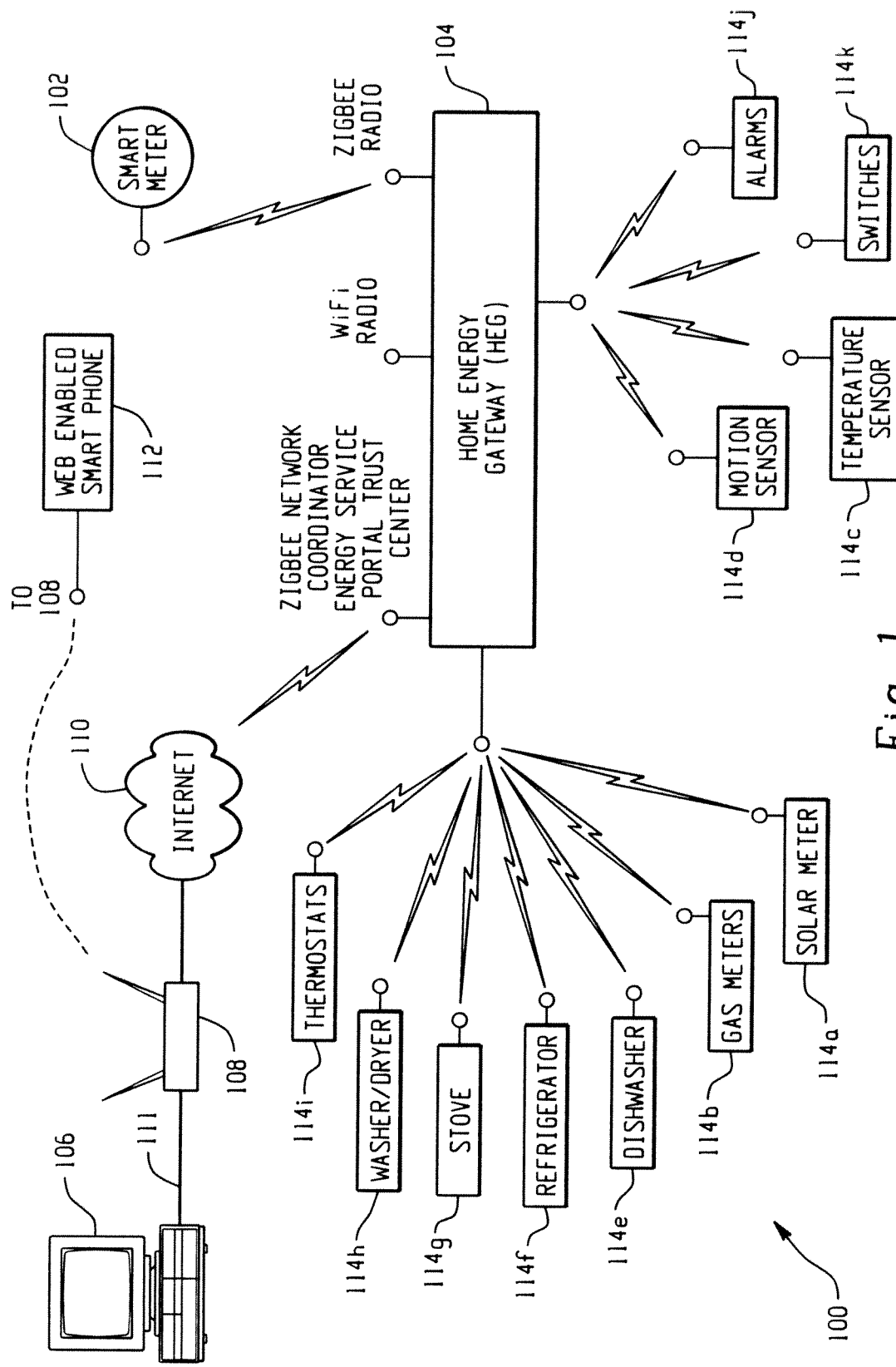
FIG. 1 a system in which the concept of a home energy gateway is implemented.

With reference to FIG. 1, an exemplary implementation of the energy management system 100 according to the present application is illustrated. The main source of information flow for the home is shown as smart electric meter 102 acting as trust center, coordinator, and/or and energy service portal (ESP), and which is configured to communicate with a home energy gateway (HEG) 104.

A computer 106 (such as a desk top, lap top of other computing device) is in operative attachment to a modem/router 108, a common manner of attaching computers to the Internet 110. In FIG. 1, a computer is connected to the router by a wired IEEE 802.3 (Ethernet) connection 111. However, it is to be appreciated the connection could be made by other known connections such as an IEEE 802.11 (Wifi) connection, power line communication or power line carrier (PLC) connection, among others. In one embodiment, the PLC connection is made using an adaptor such as sold by Netgear, Inc. of San Jose Calif. or other manufacturer for that purpose. Also, although a modem/router arrangement is shown in system 100, it is not required, and the system would function for its primary purpose of monitoring and displaying energy consumption information without such an arrangement. In that case computer 106 would connect directly to HEG 104 via a wired or wireless connection.

A web/internet enabled smart phone (or other smart handheld device) 112 is configured to communicate with HEG 104 for displaying data and configuring accessories (such as home appliances 114a-114k.

Accessories 114a-114k fall into two main categories: sensors and devices (where, depending on how the accessories are used, some will fall into both categories). Examples of sensors include solar meters 114a, gas meters 114b, temperature sensors 114c, motion sensors 114d, and appliances reporting their power consumption (such as dishwashers 114e, refrigerators 114f, stoves 114g, washers/dryers 114h, etc.). Devices include thermostats 114i, alarms 114j and simple switches 114k, along with the appliances (e.g., dishwashers 114e, etc.), when performing their normal functions. The foregoing are just some examples of accessories to which the concepts of the present application will apply.

The HEG 104 is constructed with computational capabilities and multiple communication technologies. In contrast to existing controllers (such as a HEM) used in home energy systems, HEG 104 is significantly smaller, cheaper, and consumes less power. The HEG 104 also has the capability of operating over multiple communication networks which use different formats, protocols, and bandwidths. This allows the HEG 104 to acquire and manipulate (e.g., reformat) data of one communication network (e.g., that which monitors/controls the home appliances) and to supply that manipulated data to another communication network (e.g., to the consumer electronics network, such as to a home computer, smart phone, web-enabled TV, etc.), even though these networks are not generally compatible. The manipulation includes putting the data in a format and/or location, e.g., a database, which can be accessed by the other communication networks.

Figure 2:
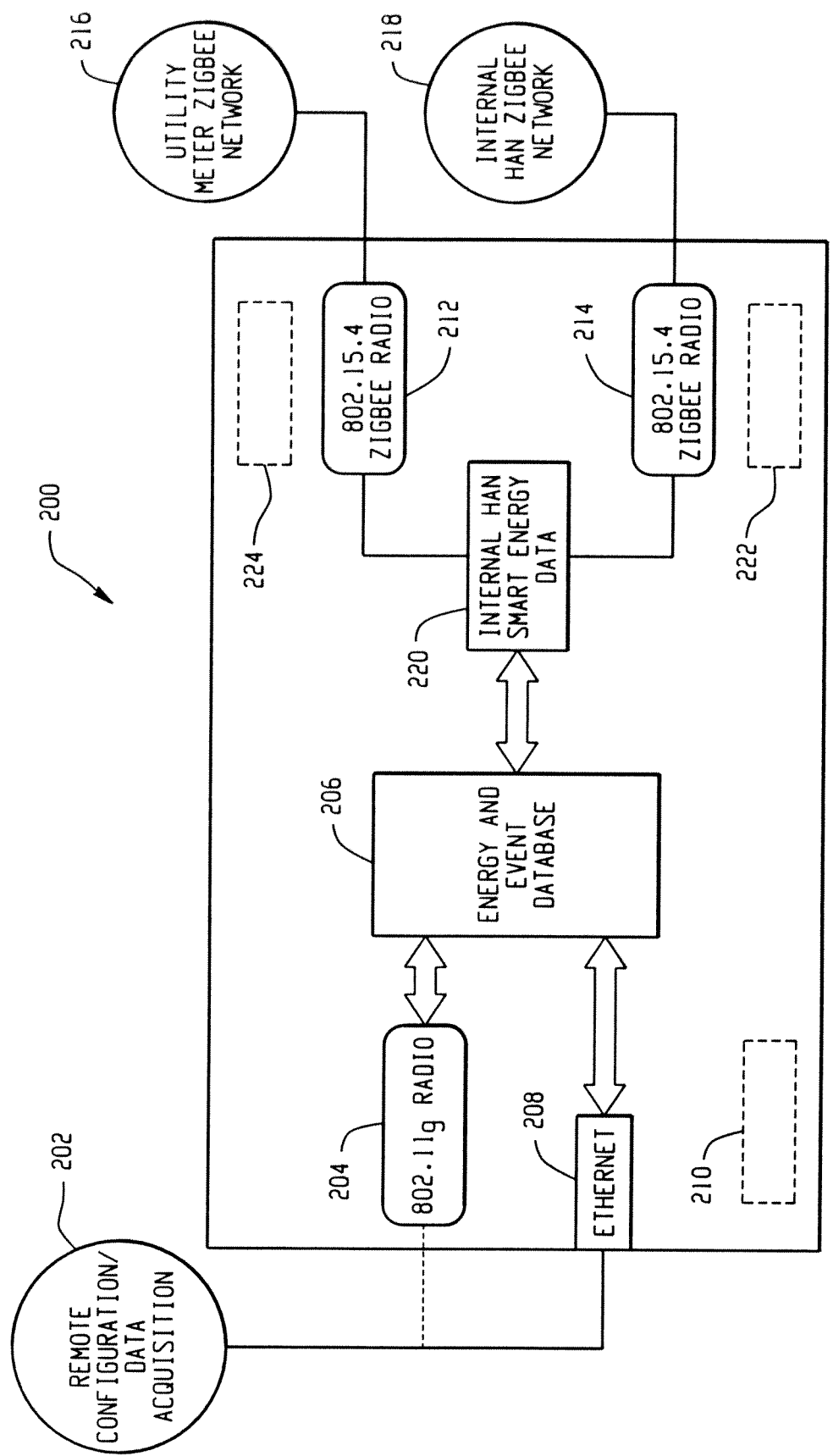
FIG. 2 illustrates a block diagram of a home energy gateway including a database according to one aspect of the present application.

With reference to FIG. 2, a block diagram 200 illustrating one embodiment of HEG 104 is provided. On the left hand side of the figure outside of block diagram 200 is remote configuration and data acquisition block (and is understood to include displays of computing devices, web/internet enabled phones, and other devices that are separate from the HEG) 202. The external data and remote configuration requests are received into block 200 via WiFi radio block 204, which in turn accesses energy and event database 206. The external data and remote configuration requests of block 202 could also enter block diagram 200 via Ethernet port 208 in order to access the energy and event database 206. In still a further embodiment a power line communication (PLC) adapter 210 (dotted lines) may be used with or as an alternative to the Ethernet port 208, in order to input the external data and remote configuration requests 202 into the energy and event database 206. Blocks 204, 208, and 210, alone or in various combinations are understood to be a first data interface channel/block.

On the right hand side of FIG. 2 is a second data interface channel/block 212 (such as a 802.15.4 Zigbee radio) and a third data interface channel/block 214 (such as a 802.15.4 Zigbee radio). The second data interface channel/block 212 is configured to send and receive data and configuration messages to/from utility meter Zigbee network 216, and the third data interface channel/block 214 is configured to send and receive data and configuration messages to/from the internal home area network (HAN) (e.g., data and configuration messages from accessories/appliances in the system) 218. The data and messages from these sources are also provided to energy and event database 206, via internal HAN smart energy block 220, which includes capabilities to identify data/information from the accessories. Functions of database 206 are discussed in more detail below. In still a further embodiment, power line interfaces 222, 224 (dotted lines) may be included with or as an alternative to the blocks 212, 214, and can be defined as the respective second and third interface channels/blocks.

Generally, an HEG does not include an internal real-time clock (RTC), such as a battery-backed real time clock. Therefore, an HEG is provided with a timing subsystem, such as an internal, non-real time clock that uses an external time server located within the host micro to maintain the ability to time-stamp data entries. The timing subsystem works to manage and synchronize the external time server or time source to the internal clock.

Figure 3:
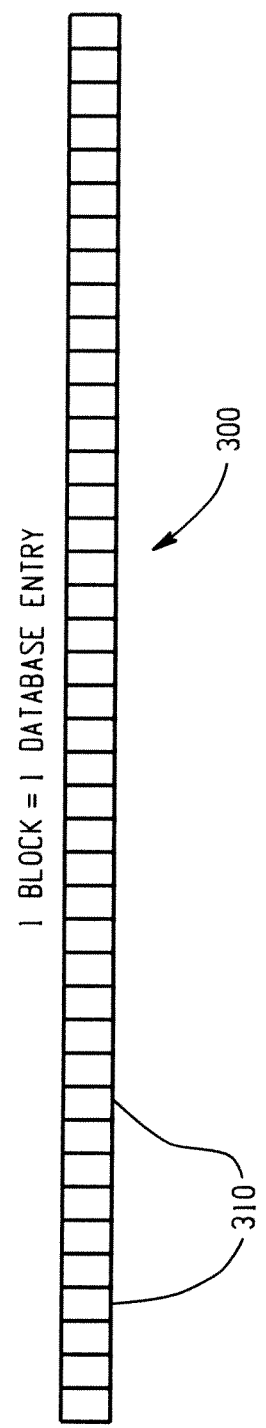
FIG. 3 illustrates a diagram of an exemplary database divided into interval blocks.

Under certain circumstances, access to the external time server may be unavailable, lost, or temporarily interrupted. To ensure that data entries can continue to be accurately added to an HEG associated timestamp-oriented database, the present disclosure is directed to a method for storing data that allows the data to be entered at fixed, pre-determined, time intervals. As best illustrated in FIG. 3, an exemplary database 300 is provided and divided into a particular number of data entry blocks 310, wherein each block 310 equals a particular time interval. For example, if the time interval was one minute, the tenth block would represent a time period ten minutes into the data collection period. The next block would be eleven minutes, and so on. The data entry blocks 310 can accept one data entry per block. Accordingly, one data entry point is entered for each time interval, such as one minute, according to the example above. When a new data entry is added to the database, the time of entry is associated therewith and the time stamped entry is stored in a data entry block corresponding to the time of entry. For exemplary purposes, the database will be described herein as having an interval time of one minute. The entry time (time stamp) associated with an entry may be computed based on any of the time stamp of the last entry, the interval at which items are added to the database, and the number of entries between the entry of interest and the last entry.

There are contemplated herein a number of possible scenarios that would result in the inability to sync to, or lost sync with, an external time server. According to a first scenario, the external time server may be unavailable at the time the HEG is installed or activated. This issue may arise in the case of, for example, a failed or improper installation. Since the HEG cannot connect with the external time server, the HEG internal clock is out of sync and unable to provide a proper time stamp for data entries. According to a second scenario, an external time server may be unavailable due to a power failure, such that the time server cannot be synchronized with the internal clock by the time the HEG is activated. According to a third scenario, synchronization with the time server may be lost, interrupted, or the time server may lose synchronization at some point while the HEG is running. In both the second and third scenarios, the HEG may be bound to a smart meter during installation, whereby a valid time server was available at that time and the connection was lost post-installation.

Since the HEG is maintaining an internal clock, the HEG may still receive data from the devices via the Zigbee network described above, and store the data in the database even if the server has lost sync. If connection with the external time server is lost, interrupted, or not synced and it subsequently becomes synched, the HEG will begin using the external time server as the time source and will update the internal clock accordingly.

In the event the current time is unknown at the initialization of the HEG system or becomes unknown during use of the HEG, in order to continue to enter and store data entries, the time stamp associated with the last known entry may be used as the current reference point and new entries may be added to the database in data entry block immediately following the last known entry block. The entries may be added to the next in line entry block regardless of the uncertainty of the actual time of the current data entry. Therefore, the data entries are necessarily added in an incorrect location relative to the actual, yet unknown current time.

When the internal clock is once again synchronized with the external time server, and the internal clock time is updated, the correct data entry block position may be determined based on any or all of the following factors: the time of the last data entry prior to the power failure, the current time, and the interval at which items are added to the database. By knowing current correct time, the proper data entry may be identified in the database. Using this reference point, the previously entered data entries may be shifted further in time in the database, such that the last "improperly" entered data entry is relocated into the data entry block corresponding to the correct time and each previous entry is shifted accordingly, such that the entries remain with the correct time order. Therefore, the data added after losing synchronization with the external timer server is placed in the proper time-associated location in the database.

The final step in the time-stamp correction process is to enter the correct data in the now-empty database blocks associated with the loss of power. If the power failure affected the entire home network, then no power was consumed during this period and the final database entry just prior to the loss of power may be copied in each now-empty block, since essentially the data did not change throughout the duration of the power loss. This may only be required in situations where the data stored in the database is a snapshot of an accumulating value, such as the energy consumption associated with one or more aspects of a residence. If, however, the database contains data that is not accumulating or is otherwise unrelated, the database location associated with the power failure can be set to zero, or some other meaningful value. In other scenarios, the power failure may only affect the external time server, such that power consumption continues even after the power failure. Therefore, in a situation where the database is cumulative, the database would reflect a large jump in power consumption in the first data block filled after the power is restored to the external time server. By copying the last data point across the empty data blocks, the difference can be spread between the last data entry prior to power loss and the first entry after power is regained. If the data blocks were left empty, it would appear that all the energy was consumed during the first data entry once power to the external time server was renewed, making the power jump less distorted.

Figure 4:
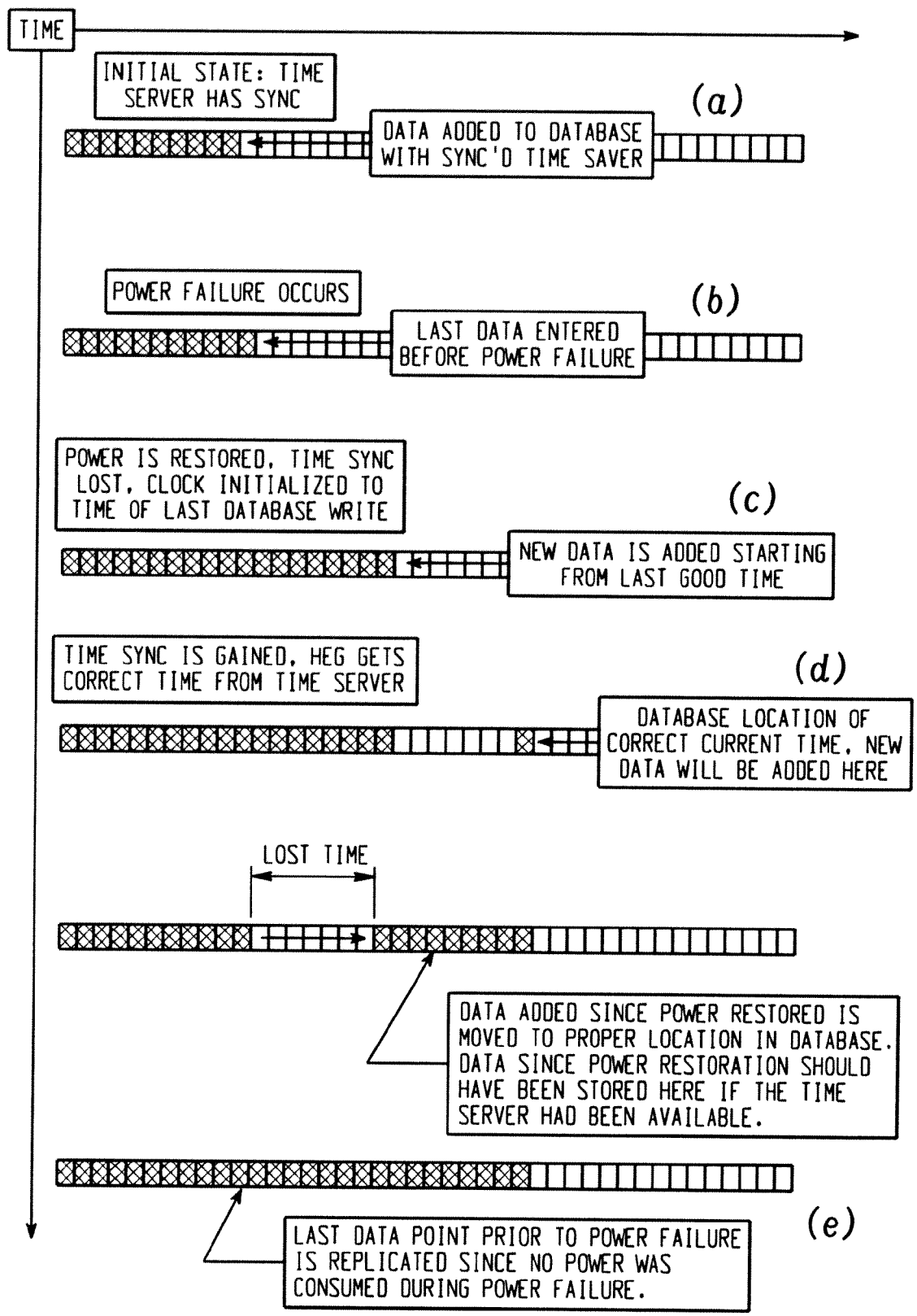
FIG. 4 illustrates a diagram of an exemplary aspect of the process of adding entries to a timestamp-oriented database after incurring a power failure.

With reference to FIG. 4, an exemplary illustration of one aspect of the above-described process is provided. In step (a), the external time server is synchronized with the internal database timer. The exemplary database herein is comprised of 42 data entry blocks (blocks 1-42). With the synchronized time server, data entries are then added to the database in one-minute intervals. For exemplary purposes, FIG. 4 will be described as synchronizing at 12:00. As illustrated in FIG. 4, a data entry block is filled with an entry each minute, for ten minutes, from 12:00-12:10, whereby blocks 1-10 of the database are filled consecutively. At 12:11, a power failure occurs (step (b)). Therefore, block 11 is the last block of data entered before the power failure occurred. At step (c), power is restored, however, time sync with the external time server has been lost, and the internal clock is initialized to the time of the last database entry, which according to this example is 12:11. Therefore, new data entries are added to the database starting at block 12 (corresponding to 12:12), which is immediately following the last known data entry. However, the time stamps of this data are not accurate, since it is likely that time passed since the power failure and the data should not be entered at block 12, but rather a block further down the line, corresponding to a later time.

At step (d), the time sync between the external time server and the internal clock is completed and the internal clock obtains the accurate real-time from the time server. In this example, time synchronization is completed at 12:27 real time. Based on this corrected time, the correct data entry block can be identified in the database. According to this exemplary embodiment, since the correct time is 12:27, sixteen minutes had passed since the power failure, so the correct block for the next data entry is block 27. The data entries that had been entered up until this point are then shifted accordingly in the database to the proper locations, such that the last entry prior to the sync falls on the correct block, block 26, and the first entry post-regaining power falls on block 19, indicating that power was restored at 12:19 real time. Therefore, the system was without power from 12:12-12:18 real time. The data entries since power restoration would have originally been stored in this location if the time server had been consistently available.

The blocks that are now empty (blocks 12-18) represent the period of lost time during the loss of power. To fill the empty database blocks, the last data entry point prior to power failure, block 12, is replicated at step (e). In one instance the data is copied into the empty blocks because there was a total power failure across the entire home network and no power was consumed during the power failure, such that the data from the last entry would assumedly not change and the data entry may be repeated to establish a constant data state. However, in another instance, power only failed with the external timer server, such that power was still consumed during the power failure, since the power consuming devices of a home network are not without power. This process of copying the last data point across the empty data blocks works to spread the difference between the last data entry prior to power loss and the first entry after power was regained. If the data blocks were left empty, it would appear that all the energy was consumed during the first data entry once power to the external time server was renewed, distorting the reading.

Once the data entries are corrected, the database may return to a normal mode to add and save data entries to the database consecutively according to the established time interval.

As briefly noted above, by synchronizing with the external time source it is easy to determine whether power there was a power outage to at least the HEG, and by comparing the current energy consumption with the last saved energy consumption value, it can be determined whether an appliance was without power. If the power outage was for an extended time period of time, there may be a desire to alert the homeowner/user. For example, it may be important to know that a refrigerator or freezer has been without power for a certain period of time (e.g., 1 hour, 4 hours, 24, hours, 48 hours, etc.). An alert can be provided (means for providing a signal or alert) to the homeowner in a number of ways, on the monitor or display screen, by message to a remote location or mobile device, by audible alarm, appliance user interface, etc., and the particular type of alert is not deemed to be limiting. If the refrigerator or freezer has been without power for an extended period time, then some foods could spoil and thus the homeowner may be alerted to take any necessary action that may be desired. Moreover, there may be some instances where short time periods are just as important. For example, if medicine (e.g., insulin) is stored in the refrigerator, then the homeowner may want to be informed about even short time periods of power outages to the refrigerator. The present system provides the homeowner with the ability to adjust, select, or set what power outage time period spawns an alert, and this may be varied from one appliance to another. It is further envisioned, that other variables (e.g., temperature data from the refrigerator) or other data from the appliance may be used to determine or confirm that power may have been lost to the appliance and not just to the HEM/HEG itself.

EXAMPLES

In a first example, the external time server is unavailable at the time the HEG is installed due to a failed or improper installation although the HEG is still able to obtain whole-home consumption information. The HEG may be programmed with the following algorithm to maintain accurate time stamped entries:
1. The HEG starts keeping time using the beginning of the Zigbee Epoch, Jan. 1, 2000.
2. A device is added to the list of the devices that the HEG is recording energy measurement for. This device measure whole-home consumption. The HEG initializes a database for this device and sets its start time to the current time as started from step 1.
3. A time server becomes available to the HEG either through configuration or correction of a malfunction of the time server.
4. The time server gains sync with its time source.
5. The time server sets its sync bit.
6. The HEG gets the time from the time server and notes that the sync bit indicates that the time server has sync.
7. The HEG calculates the elapsed time between the creation of the database, and the current time as determined by its own time keeping.
8. The HEG subtracts the elapsed time calculated in step 7 from the current time as determine from the time server.
9. The HEG sets the start time of the database to the time as calculated in step 8. The database for the device is now time-corrected. No shifting of data is required as there are no gaps in the data.
10. The HEG updates its internal clock with the time from the time server.

According to a second example, the external time server is unavailable due to a power failure and the internal clock was unable to sync prior to initialization of the HEG, such that the internal clock has no time reference at power up. The last known accurate time is the time stamp associated with the last item entered into the database. The HEM is preferably programmed with the following algorithm to overcome this scenario.
1. The HEG powers up.
2. The HEG cannot sync to an external time server.
3. The HEG retrieves the last known time from the database.
4. The HEG stores the location associated with the last known database entry.
5. The HEG initializes its internal clock to the last known time, T1.
6. The HEG retrieves energy data from devices and stores it in the database in consecutive database locations starting just after the last known database entry. It does so in a manner which is consistent with its normal function.
7. A timer server becomes available and is in sync.
8. The HEG notes the current assumed time, T2, which is the last known time plus the elapsed time since power up, E1=T2−T1.
9. The HEG retrieves the actual current time from the time server, T3.
10. The HEG calculates the actual start time from power up as T4=T3−E1.
11. The HEG copies the database data from the database locations associated with T1 through T2 to the database locations associated with T4 through T3. The copying algorithm must account for a potentially overlapping region in the database and ensure that data will not be inadvertently erased.

12. The data since power up has now been moved to the correct location in the database.
13. The HEG corrects the data in the database associated with the power outage as follows.
14. The HEG notes the energy reading associated with the last data point entered in the database just prior to power failures, P1.
15. The HEG notes the energy reading associated with T1, or the first data point entered in the database following the power outage. This is P2.
16. The HEG calculates the amount of energy used during this time as P3=P2−P1.
17. The HEG calculates the amount of energy used per each database entry as P4=P3/E1.
18. The HEG starts correcting the database by adding P4 to the database entry associated with the time T1, P5=P1+P4.
19. The HEG stores P5 in the next database location following the location associated with T1, or T1+1.
20. The HEG continues to correct the database by accumulating the energy consumed associated with the next database entry location as P5=P5+P4.
21. The HEG stores P5 in the next database entry location, or T1+2.
22. The HEG continues this accumulate-and-store process for the period from T1+1 to T4.

In Example 3, connection with the external time server is lost or interrupted during HEG use. The following example illustrates one possible algorithm, the steps of which are as follows:

1. The time server is synched with the internal clock of the HEG.
2. The HEG gets the time from the time server periodically and updates its internal clock with the time from the time server.
3. The time server loses sync with its time source.
4. The HEG gets the time from the time server and notes that the sync bit indicates that the time server has lost sync.
5. The HEG manages its internal clock without updating its time from the time server.
6. The time server gains sync with its time source.
7. The HEG gets the time from the time server and notes that the sync bit indicates that the time server has sync.
8. The HEG updates its internal clock with the time from the time server.

In a fourth example, power was lost to the HEG and a measuring device, such as an appliance, and the time server of the system is out of sync upon power up.

1. The HEG powers up.
2. The HEG cannot sync to an external time server.
3. The HEG retrieves the last known time from the database.
4. The HEG stores the location associated with the last known database entry.
5. The HEG initializes its internal clock to the last known time, T1.
6. The HEG retrieves energy data from devices and stores it in the database in consecutive database locations starting just after the last known database entry. It does so in a manner which is consistent with its normal function.
7. A timer server becomes available and is in sync.
8. The HEG notes the current assumed time, T2, which is the last known time plus the elapsed time since power up, E1=T2−T1.
9. The HEG retrieves the actual current time from the time server, T3.
10. The HEG calculates the actual start time from power up as T4=T3−E1.
11. The HEG copies the database data from the database locations associated with T1 through T2 to the database locations associated with T4 through T3. The copying algorithm must account for a potentially overlapping region in the database and ensure that data will not be inadvertently erased.
12. The data since power up has now been moved to the correct location in the database.
13. The HEG notes the energy reading associated with the last data point entered in the database just prior to power failures, P1.
14. The HEG notes the energy reading associated with T1, or the first data point entered in the database following the power outage. This is P2.
15. If P2 is same as P1 or P2 is only slightly bigger than P1 (this will depend on the device), then power outage is assumed for the device and user can be alerted if E1 is equal or bigger than the desired alert time (as picked by user or default) for device.
16. If P2 is higher than P1, then power to device was not lost and same algorithm as shown in Example 2 can be used to correct the database with lost data.

In still another example, Example 5, power was lost to the HEG and a measuring device, such as an appliance, and the time server is in sync upon power up.

1. The HEG powers up.
2. HEG retrieves time stamp from server and determines that it is in sync.
3. HEG remembers last time before power was lost T1.
4. HEG has new time, which is T2.
5. Elapsed time (or lost time) is E1=T2−T1.
6. HEG remembers last saved energy consumption for device at T1. This value is P1.
7. HEG records new energy consumption for device at T2. This value is P2.
8. If P2 is same as P1 or P2 is only slightly bigger than P1 (this will depend on the device), then power outage is assumed for the device and user can be alerted if E1 is equal or bigger than the desired alert time (as picked by user or default) for device.

If P2 is higher than P1, then power to device was not lost and same algorithm as shown in Example 2 can be used to correct the database with lost data.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A time-stamp oriented system associated with a home energy gateway (HEG) comprising:
   a plurality of data entry blocks, each data entry block corresponding to a time interval; and
   an internal database timing device configured to synchronize with an external real-time server, maintain accurate time in a database and re-synchronize with the external real-time server in the event of a loss of synchronization, wherein the timing device of said home energy gateway is configured to add time-stamped data entries to said database; and wherein the home energy gateway is configured to;

process data indicating a loss of synchronization with the external real-time server;

add at least one additional data entry to the database following a last data entry just prior to the loss of synchronization;

re-synchronize the internal clock with the external real-time server;

update the internal clock with real-time from the external real-time server;

determine a time-corrected data entry block for data entries to the database following the re-synchronization; and shift the at least one additional data entry added to the database after the loss of synchronization by a number of data entry blocks to a data entry block just prior to a position of the time-corrected data entry block, wherein a gap in data entry between a position of the last data entry just prior to the loss of synchronization and a position of a next data entry after shifting of the at least one additional data entry identifies a period of lost time during a power failure.

2. The system according to claim 1, wherein said internal database timing device is not a real-time device.

3. The system according to claim 1, wherein each data entry block corresponds to an equal time interval.

4. The system according to claim 3, wherein said time interval equals one minute.

5. The system according to claim 3, wherein said HEG is configured to add data entries to said database consecutively according to time, wherein each data entry comprises a time stamp based on the time interval said data entry was entered into said data entry block.

6. The system according to claim 1, wherein said HEG is configured to maintain accurate time stamped data entries after losing synchronization with said external time server.

7. The system according to claim 1 further comprising means configured to send a signal or alert to an associated user upon determining that an appliance experienced a power outage.

8. The system of claim 1, wherein the home energy gateway is configured to:
   replicate a last data entry prior to the loss of synchronization; and
   copy data from the last data entry into data entry blocks in the gap.

9. A method for maintaining accurately time-stamped data entries in a database associated with a home energy gateway (HEG) after incurring a power failure, wherein said HEG comprises an internal clock configured for synchronization with a real-time external time server, said method comprising:
   dividing said database into fixed interval data entry blocks, wherein each data entry block can accept one data entry;
   adding one or more data entries to said database by storing said one or more data entries in data entry blocks corresponding to the timestamp of the entry;
   processing data indicating a loss of synchronization with said external time server;
   adding at least one additional data entry to the database immediately following a last data entry prior to the loss of synchronization;
   re-synchronizing said internal clock with said external time server;
   updating the internal clock with real-time from the external time server;
   determine a time-corrected data entry block position for data entries to the database following the re-synchronization;
   determining a difference between the time-corrected data entry block position and a position of the last data entry prior to the loss of synchronization; and
   shifting each of the at least one additional data entry added to the database immediately following the last data entry prior to the loss of synchronization by a number of data entry blocks corresponding to the determined difference, wherein a gap between the position of the last data entry prior to the loss of synchronization and a position of a next data entry after the shifting of the at least one additional data entry identities a period of lost time during the power failure.

10. The method according to claim 9, wherein determining the difference between the time-corrected data entry block position and the position of the last data entry prior to the loss of synchronization is determined based on one or more of a last data entry prior to power failure, a current time, and an interval at which entries are added to the database.

11. The method according to claim 9, further including copying data from the last data entry block filled prior to the loss of synchronization into empty data entry blocks in the gap.

12. The method according to claim 9, wherein one data entry is added during each interval.

13. The method according to claim 12, wherein said interval is one minute.

14. The method according to claim 9, wherein a timestamp is computed based on the time stamp of the last data entry.

15. The method according to claim 9, including selecting a time period for a power outage which, if exceeded, then sending an alert.

16. The method of claim 15 wherein the selecting step may be varied.

17. The method of claim 9, comprising:
   replicating a last data entry prior to the loss of synchronization; and
   copying data from the last data entry into data entry blocks in the gap.

18. A method for maintaining real-time based database entry locations in a home energy gateway (HEG) associated database, said method comprising:
   synchronizing a real-time time server external to said HEG having an internal database timer;
   dividing said database into equal data entry blocks, wherein each block represents a time interval;
   adding one data entry to said database per interval, wherein each data entry is provided a timestamp;
   re-synchronizing said external time server with said internal database timer in the event of a loss of synchronization; and
   determining a correct database entry block location for data entries added after the loss of synchronization by:
      determining a location of a current time data entry block for data entries to the database following the re-synchronization;
      determining a location of a data entry block for a data entry to the database immediately following a last data entry prior to the loss of synchronization;
      determining a difference between the location of the current data entry block and the location of the data entry block for the last data entry prior to the loss of synchronization; and
   shifting a data entry added after the loss of synchronization and prior to the resynchronization by a number of data entry blocks corresponding to the determined difference.

19. The method according to claim 18, wherein determining the correct database entry block location comprises comparing a current time with a time of the last data entry prior to loss of synchronization.

20. The method according to claim 19, further including shifting each database entry added after the loss of synchronization to the correct database block location by the number of data entry blocks corresponding to the determined difference.

21. The method according to claim 20, further including copying the data entry from the last data entry block prior to loss of synchronization into empty database entry blocks located between last data entry block of the last data entry prior to the loss of synchronization and a next data entry block corresponding to the shifted data entry.

22. The method according to claim 18, wherein each time interval is an equal length of time.

23. The method according to claim 18, wherein a timestamp is computed based on the time stamp of said last entry.

24. The method of claim 19, wherein a gap between the location of the last data entry prior to the loss of synchronization and a location of a next data entry after the shifting of the data entry added after the loss of synchronization and prior to the resynchronization by a number of data entry blocks corresponding to the determined difference identifies a period of lost time during a power failure.

* * * * *

UNITED STATES PATENT AND TRADEMARK OFFICE
CERTIFICATE OF CORRECTION

| | |
|---|---|
| PATENT NO. | : 8,533,153 B2 |
| APPLICATION NO. | : 13/183017 |
| DATED | : September 10, 2013 |
| INVENTOR(S) | : Bultman et al. |

Page 1 of 1

It is certified that error appears in the above-identified patent and that said Letters Patent is hereby corrected as shown below:

In the Claims

In Column 10, Line 67, in Claim 1, delete "to;" and insert -- to: --, therefor.

Signed and Sealed this
Tenth Day of December, 2013

Margaret A. Focarino
*Commissioner for Patents of the United States Patent and Trademark Office*